(12) United States Patent (10) Patent No.: US 8,975,833 B2
Han (45) Date of Patent: Mar. 10, 2015

(54) LED DRIVING CIRCUIT

(71) Applicant: LG Innotek Co., Ltd., Seoul (KR)

(72) Inventor: Jae Hyun Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 218 days.

(21) Appl. No.: 13/652,769

(22) Filed: Oct. 16, 2012

(65) Prior Publication Data

US 2013/0093355 A1  Apr. 18, 2013

(30) Foreign Application Priority Data

Oct. 17, 2011 (KR) .......................... 10-2011-0106109

(51) Int. Cl.
*H05B 37/02* (2006.01)
*H05B 33/08* (2006.01)

(52) U.S. Cl.
CPC ........ *H05B 33/0815* (2013.01); *H05B 33/0848* (2013.01); *Y02B 20/347* (2013.01)
USPC ............................ 315/294; 315/295; 315/297

(58) Field of Classification Search
CPC .................................. H02H 1/04; H02H 1/043
USPC .................................. 315/291, 294–295, 297
See application file for complete search history.

(56) References Cited

U.S. PATENT DOCUMENTS

| | | | |
|---|---|---|---|
| 5,420,780 A * | 5/1995 | Bernstein et al. ................ | 363/89 |
| 8,022,634 B2 * | 9/2011 | Greenfeld ...................... | 315/192 |
| 8,274,237 B2 * | 9/2012 | Nagase et al. ................. | 315/247 |
| 2008/0129219 A1 * | 6/2008 | Smith et al. .................... | 315/291 |
| 2010/0026204 A1 * | 2/2010 | Hente et al. ................... | 315/291 |
| 2010/0102746 A1 * | 4/2010 | Edwards ........................ | 315/291 |
| 2010/0109554 A1 * | 5/2010 | Lecheler et al. .............. | 315/291 |
| 2011/0025217 A1 * | 2/2011 | Zhan et al. ..................... | 315/219 |
| 2011/0148318 A1 * | 6/2011 | Shackle et al. ................ | 315/291 |
| 2011/0204820 A1 * | 8/2011 | Tikkanen et al. ............. | 315/294 |
| 2012/0038289 A1 * | 2/2012 | Jee et al. ....................... | 315/291 |

* cited by examiner

*Primary Examiner* — Jason M Crawford
(74) *Attorney, Agent, or Firm* — Birch, Stewart, Kolasch & Birch, LLP (57) ABSTRACT

Disclosed is an LED driving circuit. The LED driving circuit includes a power supply, an LED array to receive a signal of the power supply, an IC connected to the LED array, and an inrush current restricting part to gradually increase an output current recognized in the IC. The inrush current restricting part comprises at least one of a frequency adjusting part and a current adjusting part.

10 Claims, 7 Drawing Sheets

LED DRIVING CIRCUIT

TECHNICAL FIELD

The disclosure relates to an LED backlight driving circuit used in a liquid crystal panel such as a TFT-LCD panel.

BACKGROUND ART

A liquid crystal panel such as a TFT-LCD panel includes an LED backlight driving circuit to drive the LED backlight in order to turn on the LED backlight and stabilize the lighting of the LED backlight. The LED backlight driving circuit employs a converter (e.g., a boost converter) to convert voltage through a predetermined switching operation.

Figure 1:
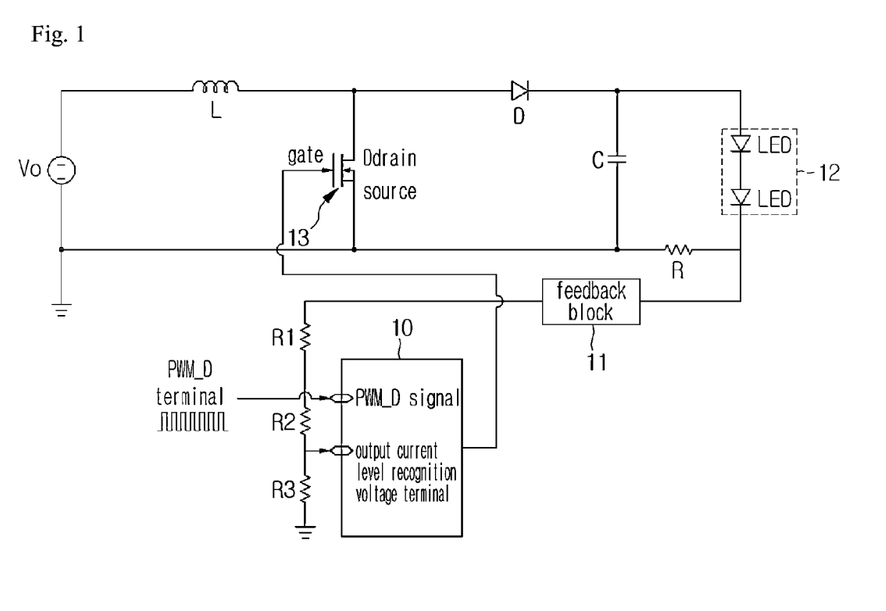
FIG. 1 is a circuit diagram showing an LED backlight driving circuit according to the related art.

As shown in FIG. 1, the LED backlight driving circuit includes a PWM IC 10, which is turned on/off according to a PWM_D on/off signal to generate a high-frequency pulse-type gate signal, the pulse width of which is increased or decreased according to an output current level of the LED backlight, an FET switching device 13, which switches driving voltage according to the gate signal output from the PWM IC 10, an inductor L used to reduce current ripples, a capacitor C used to constantly maintain output voltage, a diode D to restrict reverse current from the LED backlight, the LED backlight 12, which emits light according to the output voltage, a feedback block 11, which provides the level of the output current of the LED backlight 12 to the PWM IC 10, and conversion resistors R1, R2, and R3 connected to the feedback block 11 in series to convert the level of the output current into the voltage level.

In the LED backlight driving circuit having the above structure, the FET switching device 13 is open to supply voltage to the LED backlight 12 through the diode D at the active duration in which energy is supplied to the LED backlight 12 from a power supply V0. In contrast, the FET switching device 13 is conducted so that voltage is not supplied to the LED backlight 12 through the diode D at a passive duration in which energy is not transferred to the LED from the power supply V0. Therefore, the output voltage is controlled by changing the duty rate between the active duration and the passive duration at a predetermined switching frequency.

Figure 2:
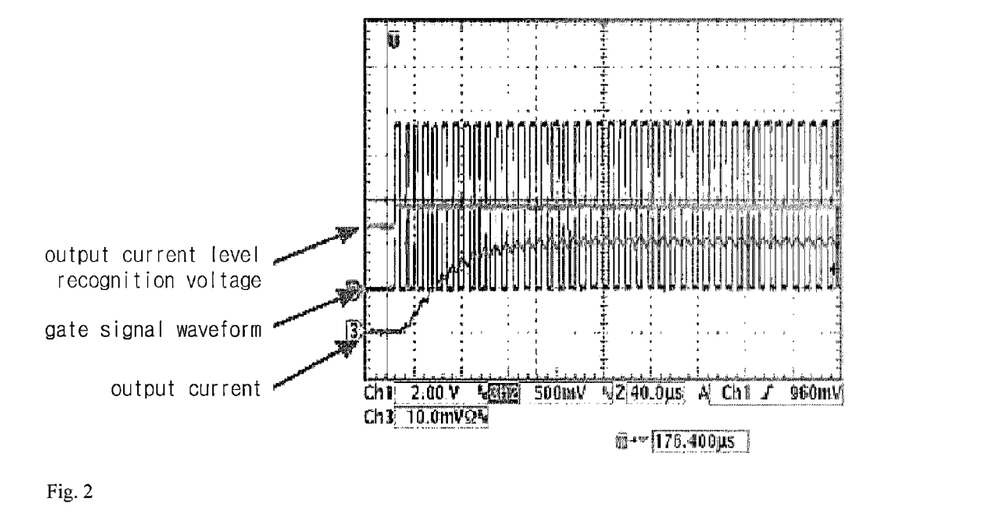
FIG. 2 is a view showing the waveforms of an output current level recognition voltage and a gate signal in the LED backlight driving circuit according to the related art.

In the case of the LED backlight driving circuit, when the driving of the LED backlight driving circuit is started in the initial stage, the recognition voltage of the output current level is applied to an output current level recognition voltage terminal of the PWM IC 10 in the form of the square wave as shown in FIG. 2. Accordingly, the gate signal of a PWM IC is generated for a predetermined duty cycle when a PWM dimming signal is applied to a PWM_D terminal. However, when the gate signal of the PWM IC is generated for the predetermined duty cycle, the FET switching device is simultaneously driven by the gate signal. Accordingly, inrush current is instantly caused due to the leakage component in the converter. When the inrush current is caused at a section in which AC is cut off by the leakage component of the converter as described above, noise may be generated in an inductor and a capacitor due to the inrush current.

Technical Problem

The embodiment is to provide an LED backlight driving circuit capable of blocking noise generated in an inductor and a capacitor by preventing inrush current caused by a leakage component of the converter.

Technical Solution

According to the embodiment, there is provided an LED driving circuit. The LED driving circuit includes a power supply, an LED array to receive a signal of the power supply, an IC connected to the LED array, and an inrush current restricting part to gradually increase an output current recognized in the IC. The inrush current restricting part comprises at least one of a frequency adjusting part and a current adjusting part.

Advantageous Effects

As described above, according to the embodiment, the inrush current caused by the leakage component of the converter is not generated.

A flicker phenomenon can be prevented by increasing the frequency to prevent the inrush current, and the LED can be stably driven with the minimum brightness.

BEST MODE

Mode for Invention

Hereinafter, exemplary embodiments of the disclosure will be described in detail with reference to accompanying drawings. The details of other embodiments are contained in the detailed description and accompanying drawings. The advantages, the features, and schemes of achieving the advantages and features of the disclosure will be apparently comprehended by those skilled in the art based on the embodiments, which are detailed later in detail, together with accompanying drawings. The same reference numerals will be assigned to the same elements throughout the whole description.

Figure 3:
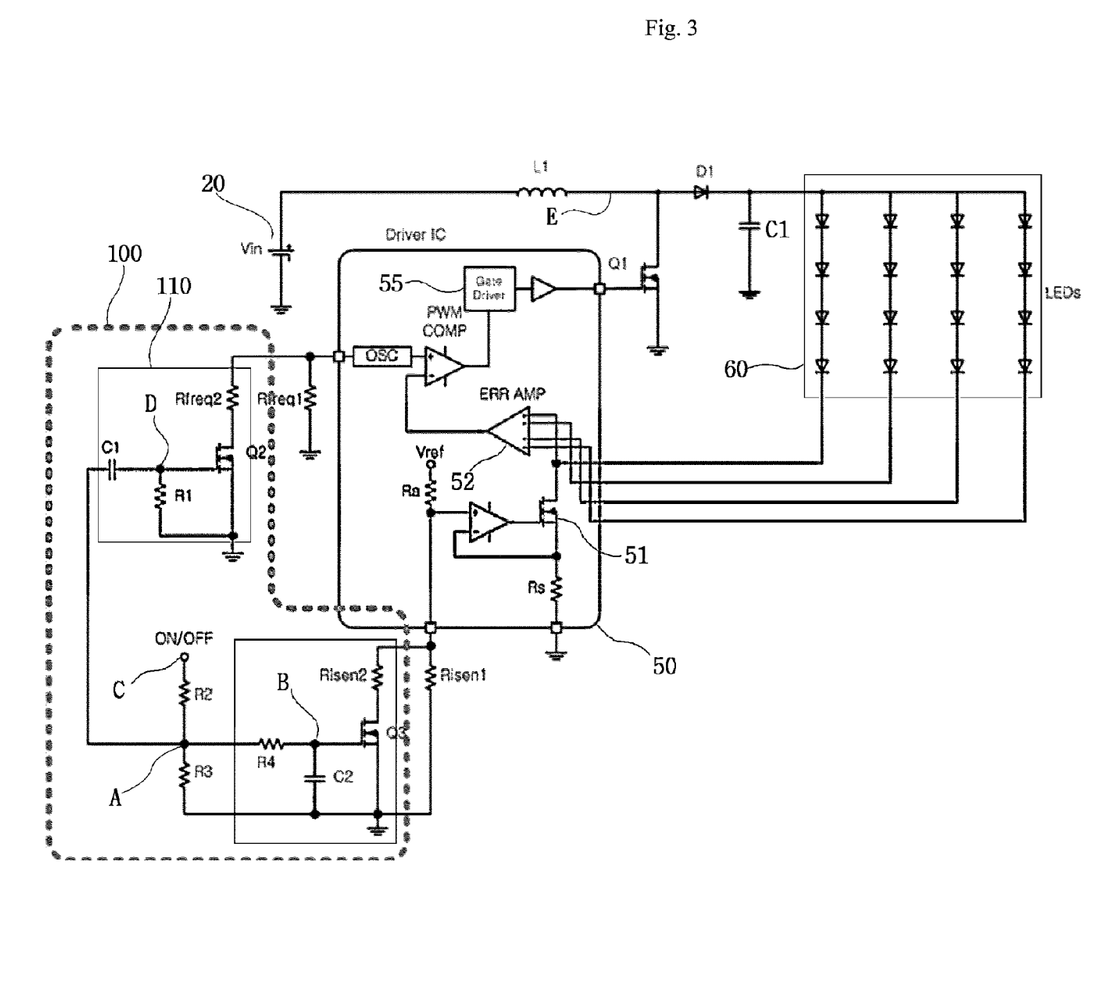
FIG. 3 is a circuit diagram showing an LED backlight driving circuit according to the embodiment of the disclosure.

FIG. 3 is a circuit diagram showing an LED backlight driving circuit according to the embodiment of the disclosure. The LED backlight driving circuit according to the embodiment of the disclosure includes a power supply 20, an inductor L1 used to reduce current ripples, a capacitor C1 used to constantly maintain output voltage, and a diode D1 used to restrict reverse current from an LED array part 60, thereby supplying stable driving power. A switching device Q1 reduces output current if great current flows through the LED array part 60. In contrast, the switching device Q1 increases the output current if small current flows through an LED backlight.

In addition, the LED backlight driving circuit includes the LED array 60, an IC 50, and an inrush current restricting part 100. The inrush current restricting part 100 includes a frequency adjusting part 110 and a current adjusting part 120.

The frequency adjusting part 110 and the current adjusting part 120 may be connected to each other in parallel.

Voltage output through the voltage division by voltage division resistors R2 and R3 may be applied to the current adjusting part 120 through a fourth resistor R4 connected in series, and may be applied to the frequency adjusting part 110 through a first capacitor C1 connected in series.

In general, the IC 50 allows the output of a cathode terminal of the LED array part 60 to be connected to a FET 51 and an ERR AMP 52 inside the IC 50 to restrict current applied to the LED array 60 through resistors Rs, Ra, and Risen1, and controls a gate driver 55 to allow the ERR AMP 52 to generate a constant output by comparing the output of the ERR AMP 52 with the output of an OSC.

The LED driving circuit must receive low current in order to perform a soft start in which an inrush current is not caused in an initial driving stage. In this case, frequency must be increased so that the LED array 60 can normally operate without turning off even at the low brightness. For example, the frequency of initial driving current may be 500 KHz.

However, even if the LED array 60 is normally operated after the initial driving has been completed, if a high frequency is continuously input, an inductor L1 and the switching device Q1 may emit heat. Accordingly, the driving circuit may be damaged. In order to solve the problem, a frequency must be automatically reduced (for example, reduced to 200 kHz), and current must be increased after a predetermined time has been elapsed from a time point in which an initial driving current is input, for example, after a time in a range of 1 sec to 1.5 sec has been elapsed from the time point in which the initial driving current is input. To this end, the frequency adjusting part 110 and the current adjusting part 120 are provided.

Figure 4:
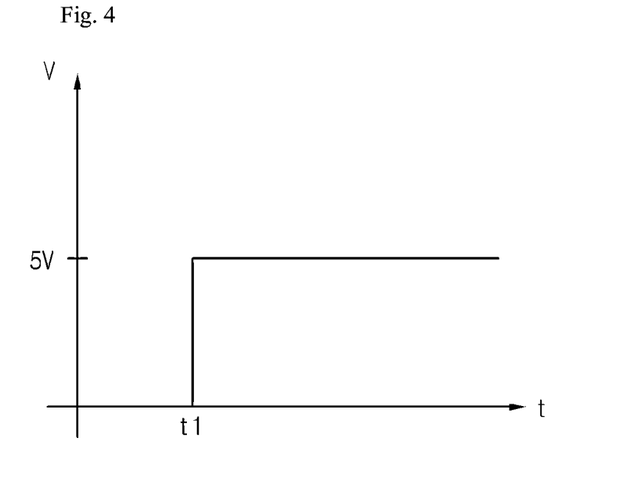
FIG. 4 is a graph showing voltage applied to a terminal C of FIG. 3 according to the lapse of time.
Figure 5:
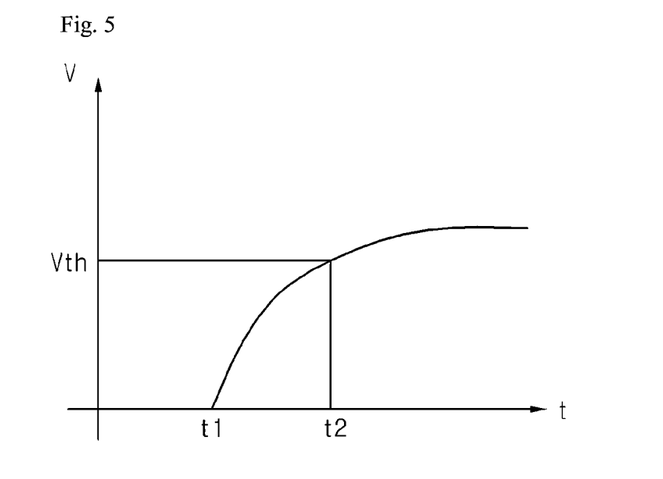
FIG. 5 is a graph showing voltage applied to a node B of FIG. 3 according to the lapse of time.
Figure 6:
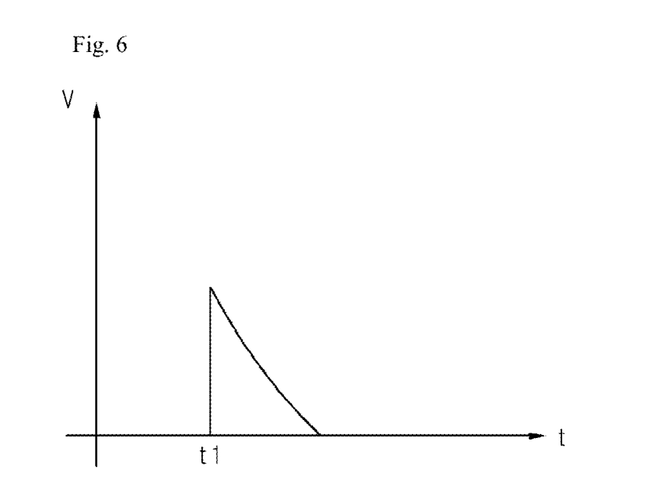
FIG. 6 is a graph showing voltage applied to a node D of FIG. 3 according to the lapse of time.

Hereinafter, the operating principles of the frequency adjusting part 110 and the current adjusting part 120 will be described with reference to FIGS. 4 to 6. FIG. 4 is a graph showing voltage applied to a terminal C of FIG. 3 according to the lapse of time, FIG. 5 is a graph showing voltage applied to a node B of FIG. 3 according to the lapse of time, and FIG. 6 is a graph showing voltage applied to a node D of FIG. 3 according to the lapse of time.

First, the operating principle of the current adjusting part 120 will be described below. If a high signal of 5V is applied to the terminal C at a time point t1 through the initial driving, predetermined voltage is input to the node A through the voltage division resistors R2 and R3. For example, if the voltage division resistors R2 and R3 are 5 kΩ and 10 kΩ, respectively, voltage of 3.33V may be input to the node A.

As shown in FIG. 4, since the high signal of 5V is continuously input to the terminal C, the voltage of 3.33V is continuously input to the node A. Therefore, the voltage of the node B is determined by the fourth resistor R4 and a capacitor C2, and voltage is charged in the capacitor C2 according to the lapse of time. In this case, a resistor Risen2 is in a floating state until a turn-on voltage for a gate terminal of a switching device Q3 is ensured so that the transistor Q3 is turned on. Therefore, only a resistor Risen1 exists to prevent inrush current.

As the capacity of the capacitor C2 is increased, the time to turn on the switching device Q3 may be increased. Accordingly, if necessary, the capacity of the capacitor C2 can be adjusted to a desirable value.

However, as shown in FIG. 5, the voltage of the node B is increased due to the capacitor C2 according to the lapse of time, and at least voltage to turn-on the switching device Q3 is input to the gate terminal of the switching device Q3 at the time point of t2, so that the switching device Q3 is turned on. The switching device Q3 may include an N channel-type FET.

If the switching device Q3 is turned on, the resistors Risen1 and Risen2 are connected in parallel, so that the total resistance value is reduced. Accordingly, the current value input to the IC 50 is increased. Therefore, stable current required for the driving can be supplied to the LED array 60.

In other words, during the charging of the capacitor C2, the inrush current can be prevented from being introduced in the initial driving stage. After the capacitor C2 has been completely charged, the total resistance value is reduced, so that the value of the current input to the IC 50 is increased.

Hereinafter, the operating principle of the frequency adjusting part 110 will be described. FIG. 6 shows the voltage variation according to the lapse of time due to the capacitor C1 and the resistor R1 after inputting the voltage of 3.33V of the node A to the frequency adjusting part 110. In other words, the switching device Q2 constituting the frequency adjusting part 110 is turned on and operated at the time point t1. Accordingly, resistors Rfreq1 and Rfreq2 are connected to each other in parallel. Therefore, the total resistance value is reduced, so that the output frequency is increased.

However, if voltage input to a gate terminal of the switching device Q2 is reduced to the turn-on voltage for the switching device Q2 or less according to the lapse of time, the switching device Q2 is turned off. If the switching device Q2 is turned off, the resistor Rfreq2 is in the floating state, so that only the resistor Rfreq1 may be operated. Therefore, the output frequency is reduced. As the output frequency of the frequency adjusting part 110 is reduced, the problem related to the heat emitted from a device can be solved.

Figure 7:
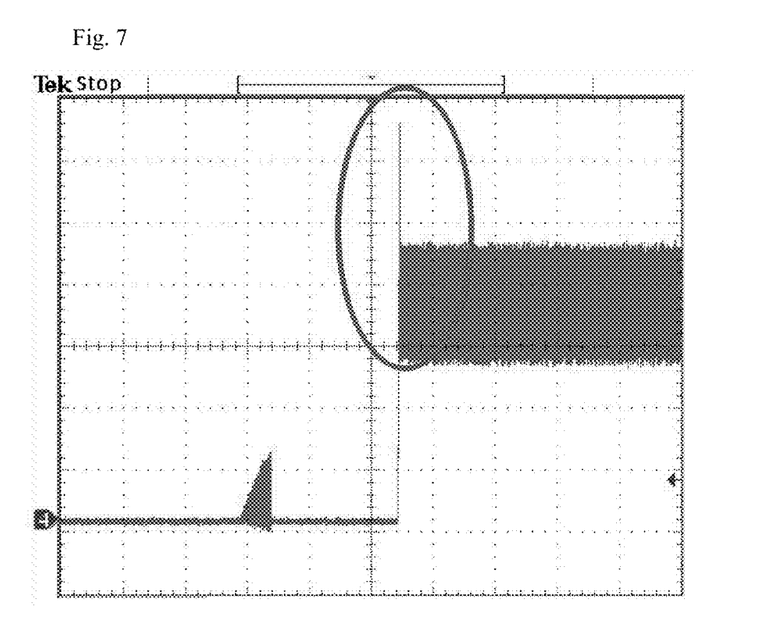
FIGS. 7 and 8 are views showing waveforms of current input to a point E of FIG. 3 according to the related art and according to the embodiment of the disclosure, respectively, while comparing the related art with the embodiment of the disclosure.
Figure 8:
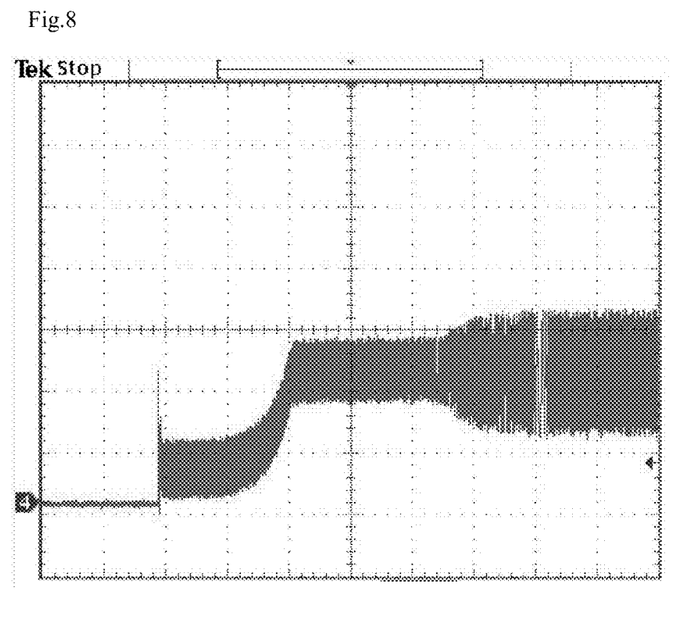

FIGS. 7 and 8 are views showing waveforms of current input to a point E of FIG. 3 according to the related art and according to the embodiment of the disclosure, respectively, while comparing the related art with the embodiment of the disclosure. FIG. 7 is a view showing the waveform of the current of a circuit according to the related art, and FIG. 8 is a view showing the waveform of the current of a circuit according to the embodiment of the disclosure.

As shown in FIG. 7, when an initial turn-on voltage is applied, current passing through the inductor L1 is raised to a peak current value of 3.2 A. In contrast, according to the embodiment of the disclosure, the current is reduced to a peak current value of 1.57 A.

The embodiment of the disclosure may selectively include the frequency adjusting part 110 and the current adjusting part 120. In other words, the inrush current restricting part 100 may include only the frequency adjusting part 110 or only the current adjusting part 120 if necessary. In addition, the inrush current restricting part 100 may include both of the frequency adjusting part 110 and the current adjusting part 120.

Figure 9:
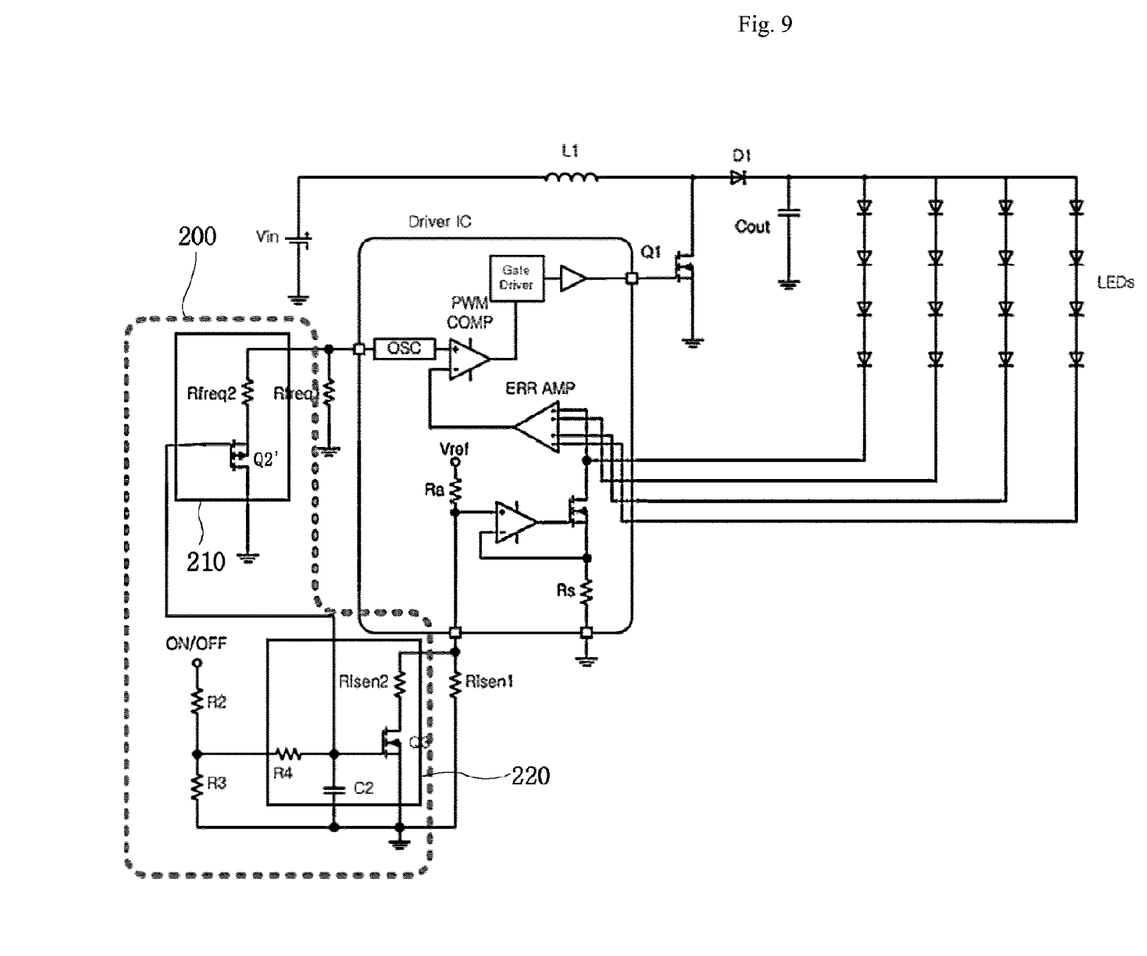
FIG. 9 is a circuit diagram showing an LED backlight driving circuit according to another embodiment of the disclosure.

FIG. 9 is a circuit diagram showing an LED backlight driving circuit according to another embodiment of the disclosure. Differently from the circuit of FIG. 3, a P channel-type FET is employed as a switching device Q2 constituting a frequency adjusting part 210 instead of the N channel-type FET, so that a resistor R1 and a capacitor C1 are omitted from FIG. 3. Accordingly, the cost can be saved, and a circuit can be simplified. In this case, the waveform of the voltage input the gate terminal of the switching device Q2 is the same as the waveform of the voltage input to the gate terminal of the switching device Q3.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An LED driving circuit comprising:
a power supply;
an LED array to receive a signal of the power supply;
an IC connected to the LED array; and
an inrush current restricting part to gradually increase an output current recognized in the IC,
wherein the inrush current restricting part comprises at least one of a frequency adjusting part and a current adjusting part,
wherein the frequency adjusting part comprises an FET, a capacitor, and a resistor, and wherein one end of the resistor is connected to a ground terminal, and an opposite end of the resistor is connected to a gate of the FET, and
wherein the current adjusting part comprises an FET, a capacitor, and a resistor, and wherein one end of the capacitor is connected to a ground terminal, and an opposite end of the capacitor is connected to a gate of the FET.

2. The LED driving circuit of claim 1, wherein the FET is an N type FET.

3. The LED driving circuit of claim 2, further comprising a resistor connected to a drain of the N type FET.

4. The LED driving circuit of claim 1, wherein the FET is an N type FET.

5. The LED driving circuit of claim 4, further comprising a resistor connected to a drain of the N type FET.

6. An LED driving circuit comprising:
a power supply;
an LED array to receive a signal of the power supply;
an IC connected to the LED array; and
an inrush current restricting part to gradually increase an output current recognized in the IC,
wherein the inrush current restricting part comprises a frequency adjusting part and a current adjusting part, and
wherein the frequency adjusting part is connected to the current adjusting part in parallel.

7. The LED driving circuit of claim 6, wherein the frequency adjusting part and the current adjusting part receive a voltage which is output through voltage division by voltage division resistors.

8. The LED driving circuit of claim 7, wherein the voltage, which is output through the voltage division by the voltage division resistors, is input to the current adjusting part through a fourth resistor connected in series, and input to the frequency adjusting part through a first capacitor connected in series.

9. An LED driving circuit comprising:
a power supply;
an LED array to receive a signal of the power supply;
an IC connected to the LED array; and
an inrush current restricting part to gradually increase an output current recognized in the IC,
wherein the inrush current restricting part comprises a frequency adjusting part and a current adjusting part, the frequency adjusting part comprises a P type FET, the current adjusting part comprises an N type FET, and a voltage applied to a gate terminal of the P type FET is equal to a voltage applied to a gate terminal of the N type FET.

10. The LED driving circuit of claim 9, wherein the current adjusting part comprises an FET, a capacitor, and a resistor, and wherein one end of the capacitor is connected to a ground terminal, and an opposite end of the capacitor is connected to the gate terminal of the FET.

* * * * *